US012573120B2

(12) United States Patent
Poynter

(10) Patent No.: US 12,573,120 B2
(45) Date of Patent: Mar. 10, 2026

(54) LIVE VENUE PERFORMANCE CAPTURE AND VISUALIZATION OVER GAME NETWORK

(71) Applicant: Sphere Entertainment Group, LLC, New York, NY (US)

(72) Inventor: Benjamin Poynter, New York, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 57 days.

(21) Appl. No.: 18/215,940

(22) Filed: Jun. 29, 2023

(65) Prior Publication Data

US 2025/0005835 A1 Jan. 2, 2025

(51) Int. Cl.
G06T 13/40 (2011.01)
A63F 13/213 (2014.01)
(Continued)

(52) U.S. Cl.
CPC ............ G06T 13/40 (2013.01); A63F 13/213 (2014.09); A63F 13/35 (2014.09); A63F 13/428 (2014.09);
(Continued)

(58) Field of Classification Search
None
See application file for complete search history.

(56) References Cited

U.S. PATENT DOCUMENTS 10,796,489 B1 * 10/2020 Cordes .................. A63F 13/213
11,514,653 B1 11/2022 Cordes et al.
(Continued)

FOREIGN PATENT DOCUMENTS

CN 113822970 A 12/2021
WO WO-2023022709 A1 * 2/2023 ............. G06T 13/40

OTHER PUBLICATIONS

International Search Report and Written Opinion directed to related International Application No. PCT/US2023/075422, mailed Apr. 16, 2024; 11 pages.
(Continued)

*Primary Examiner* — Jwalant Amin
(74) *Attorney, Agent, or Firm* — Sterne, Kessler, Goldstein & Fox P.L.L.C.

(57) ABSTRACT

Systems, methods, and apparatuses disclosed herein can incorporate one or more real-world performers that are performing within a venue into interactive content. These systems, methods, and apparatuses can identify one or more joints or ligaments, for example, left shoulders, right knees, among others, of the one or more real-world performers from the image, or the series of images, of the one or more real-world performers. These joints or ligaments can be represented as one or more performer markers. These systems, methods, and apparatuses can generate one or more three-dimensional models of the one or more real-world performers in a three-dimensional space from the one or more performer markers. These systems, methods, and apparatuses can apply the one or more three-dimensional models of the one or more real-world performers to the one or more virtual characters in the three-dimensional space. These systems, methods, and apparatuses can render the one or more virtual characters from the three-dimensional space into a two-dimensional space of the interactive content to integrate the one or more real-world performers into the interactive content.

28 Claims, 4 Drawing Sheets

(51) Int. Cl.

| | |
|---|---|
| *A63F 13/35* | (2014.01) |
| *A63F 13/428* | (2014.01) |
| *A63F 13/52* | (2014.01) |
| *A63F 13/55* | (2014.01) |
| *A63F 13/655* | (2014.01) |
| *A63F 13/92* | (2014.01) |
| *G06F 3/01* | (2006.01) |
| *G06T 11/00* | (2006.01) |
| *G06T 13/80* | (2011.01) |
| *G06T 17/00* | (2006.01) |
| *G06T 19/00* | (2011.01) |
| *A63F 13/65* | (2014.01) |

(52) U.S. Cl.
CPC .............. *A63F 13/52* (2014.09); *A63F 13/55* (2014.09); *A63F 13/655* (2014.09); *A63F 13/92* (2014.09); *G06F 3/011* (2013.01); *G06T 11/00* (2013.01); *G06T 13/80* (2013.01); *G06T 17/00* (2013.01); *G06T 19/006* (2013.01); *A63F 13/65* (2014.09)

(56) References Cited

U.S. PATENT DOCUMENTS

| | | |
|---|---|---|
| 2005/0113167 A1 | 5/2005 | Buchner et al. |
| 2013/0163960 A1 | 6/2013 | Abecassis |
| 2015/0350628 A1 | 12/2015 | Sanders et al. |
| 2021/0166479 A1 | 6/2021 | Fukumoto et al. |
| 2023/0062315 A1 | 3/2023 | Poynter |

OTHER PUBLICATIONS

Anthousis Andreadis et al: "Real-Time Motion Capture Technology on a Live Theatrical Performance with Computer Generated Scenery", Informatics (PCI) I 2010 14th Panhellenic Conference on, IEEE, Piscataway, NJ, USA, Sep. 10, 2010 (Sep. 10, 2010) , pp. 148-152, XP031774425.

Fulton Stephanie Fultonsn@Whitman Edu et al: "Stage Together: Remote Rehearsal of Theater Blocking", proceedings of the 15th international conference on pervasive technologies related to assistive environments, acmpub27, New York, NY, USA, Jun. 22, 2022 (Jun. 22, 2022) , pp. 1-5, XP058817634.

* cited by examiner

300

INSTALL THE INTERACTIVE
CONTENT ONTO THE PORTABLE
ELECTRONIC DEVICE.

302

EXECUTE THE INTERACTIVE
CONTENT INSTALLED ONTO THE
PORTABLE ELECTRONIC DEVICE.

304

LIVE VENUE PERFORMANCE CAPTURE AND VISUALIZATION OVER GAME NETWORK

BACKGROUND

Live performances, such as concerts or theatre to provide some examples, are typically one-way interactions in which one or more real-world performers present for an audience. In a traditional audience-performer relationship, the interaction between performer and the audience flows only from the performer to the audience. Even if interactions occur from the audience to the performer, these are typically minimal interactions on the part of the audience. They can include an audience chanting in response to a request by the performer, an audience singing lyrics with a song performed, an audience holding lighters or glow sticks to illuminate a venue, an audience clapping in response to a performance, filling out a questionnaire following the show, etc. For the audience that chooses to witness a live performance, they consume more but never so often participate, which leaves the value of attending a live performance with more to be desired.

BRIEF DESCRIPTION OF THE DRAWINGS

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

Figure 1:
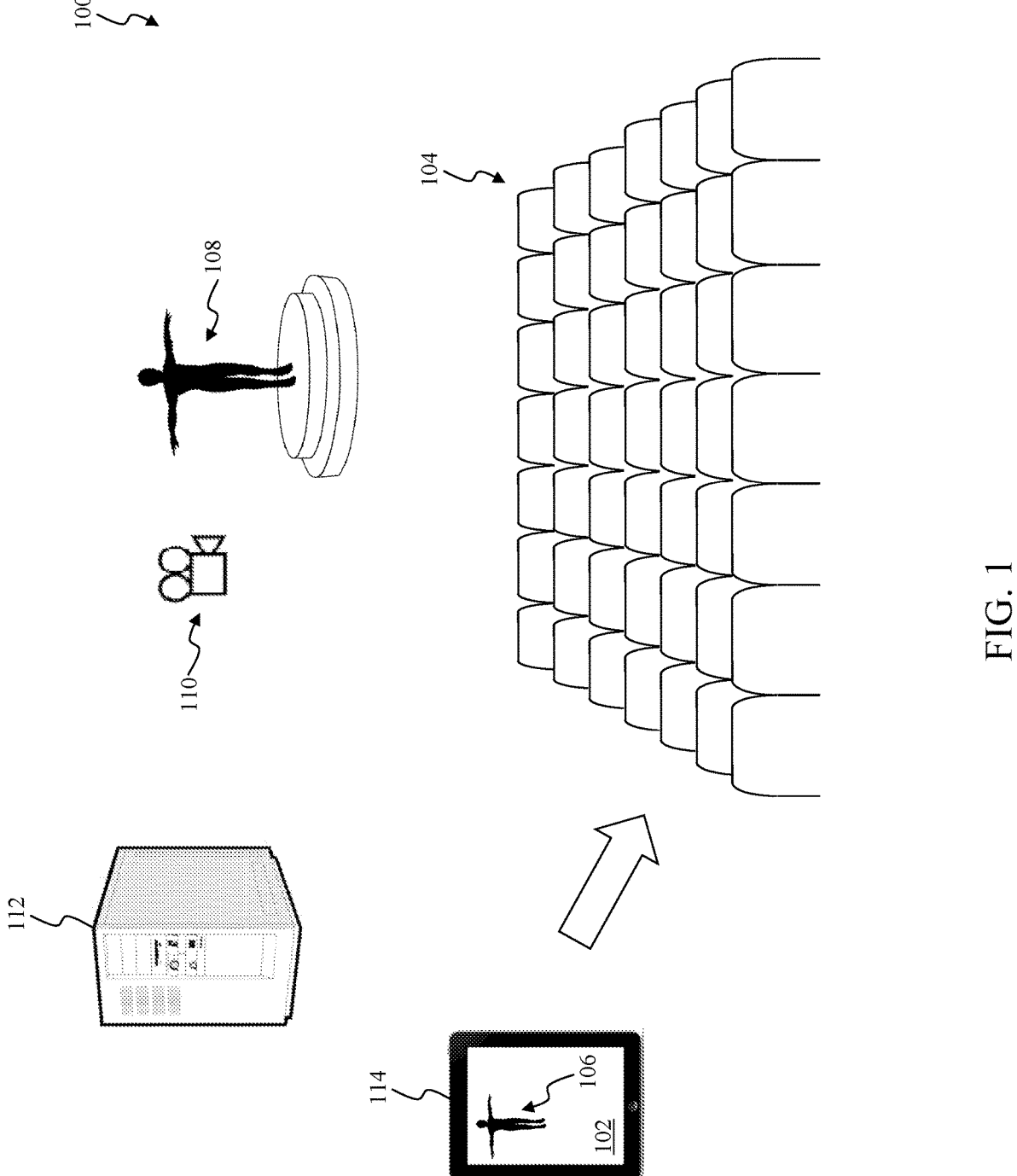
FIG. 1 graphically illustrates an exemplary venue for integrating an exemplary performer into an exemplary interactive content in accordance with some exemplary embodiments of the present disclosure.

The present disclosure will now be described with reference to the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. Aspects of the present disclosure are best understood from the following detailed description when read with the accompanying figures. The present disclosure may repeat reference numerals and/or letters in the various examples. This repetition does not in itself dictate a relationship between the various embodiments and/or configurations discussed. It is noted that, in accordance with the standard practice in the industry, features are not drawn to scale. In fact, the dimensions of the features may be arbitrarily increased or reduced for clarity of discussion.

Overview

Systems, methods, and apparatuses disclosed herein can incorporate one or more real-world performers that are performing within a venue into interactive content. These systems, methods, and apparatuses can identify one or more joints or ligaments, for example, left shoulders, right knees, among others, of the one or more real-world performers from an image, or a series of images, of the one or more real-world performers. As to be described in further detail below, these joints or ligaments can be represented as one or more performer markers. These systems, methods, and apparatuses can generate one or more three-dimensional models of the one or more real-world performers in a three-dimensional space from the one or more performer markers. These systems, methods, and apparatuses can apply the one or more three-dimensional models of the one or more real-world performers to the one or more virtual characters in the three-dimensional space. These systems, methods, and apparatuses can render the one or more virtual characters from the three-dimensional space into a two-dimensional space of the interactive content to integrate the one or more real-world performers into the interactive content.

Exemplary Venue for Integrating an Exemplary Performer into an Exemplary Interactive Content FIG. 1 graphically illustrates an exemplary venue for integrating an exemplary performer into an exemplary interactive content in accordance with some exemplary embodiments of the present disclosure. In the exemplary embodiment illustrated in FIG. 1, a venue 100 can enable interactive content to members of an audience within the venue 100. As to be described in further detail below, the venue 100 can incorporate one or more real-world performers that are performing within the venue 100 into the interactive content. Generally, the venue 100 represents a location for hosting an event. For example, the venue 100 can represent a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. The event can represent a musical event, a theatrical event, a sporting event, a motion picture, and/or any other suitable event that will be apparent to those skilled in the relevant art(s) without departing the spirit and scope of the present disclosure. In the exemplary embodiment illustrated in FIG. 1, the venue 100 can present interactive content 102 to members of an audience 104 within the venue 100.

In the exemplary embodiment illustrated in FIG. 1, the interactive content 102 can solicit participation from the members of the audience 104 to perform actions relating to, for example, hand-eye coordination and/or reaction-time. In some embodiments, the interactive content 102 can include one or more genres of video games, such as action video games, adventure video games, fighting video games, platform video games, puzzle video games, racing video games, role-playing video games, rhythm video games, shooter video games, simulation video games, sports video games, strategy video games, and/or any other suitable genres of video games that solicits direct and/or active participation of the members of the audience 104 that will be apparent to those skilled in the relevant art(s) without departing from the spirit and scope of the present disclosure. Alternatively, or in addition to, the interactive content 102 can include other interactive content, such as interactive surveys and/or interactive polls to provide some examples, to acquire various information from the members of the audience 104. As to be described in further detail below, the interactive content 102 can include one or more virtual characters 106, such as one or more player characters, non-player characters, avatars, or the like to provide some examples, which emulate one or more real-world performers 108 within the venue 100. As to be described in further detail below, the venue 100 can integrate one or more real-world performers 108 into the interactive content 102 as the one or more virtual characters 106. For example, if the one or more real-world performers 108 were to wave to the members of the audience 104 within the venue 100, the one or more virtual characters 106 similarly appear to wave to the members of the audience 104 within the interactive content 102.

In the exemplary embodiment illustrated in FIG. 1, the venue 100 can capture the movement of the one or more real-world performers 108 within the venue 100 through motion capture. In some embodiments, the venue 100 can implement a markerless approach to capture the movement of the one or more real-world performers 108. In these embodiments, the markerless approach can utilize, for example, computer vision, and/or deep learning techniques that will be apparent to those skilled in the relevant art(s) without departing from the spirit and scope of the present disclosure to identify and/or parse the one or more real-world performers 108 from an image, or a series of images, commonly visualized as video. In these embodiments, the venue 100 can capture the movement of the one or more real-world performers 108 within the venue 100 from the image, or the series of images, of the one or more real-world performers 108. In some embodiments, the venue 100 can capture the movement of the one or more real-world performers 108 in real-time or near real-time. As illustrated in FIG. 1, the venue 100 can include one or more cameras 110, a content server 112, and/or portable electronic devices 114. The one or more cameras 110 can capture the image, or the series of images, of the one or more real-world performers 108. In some embodiments, the one or more cameras 110 can include one or more ultra-wide-angle lenses having a field of view between approximately one hundred (100) and approximately one-hundred eighty (180) degrees that will be recognized by those skilled in the relevant art(s) without departing from the spirit and scope of the present disclosure. In some embodiments, the one or more cameras 110 can be implemented as one or more television studio cameras that can stand on the floor of the venue 100, for example, with pneumatic mechanisms or hydraulic mechanisms that can adjust heights and/or positions of the one or more cameras 110 in the venue 100. In these embodiments, the content server 112 can include a camera control unit (CCU) to adjust the heights and/or the positions of the one or more cameras 110 in real-time, or near real-time, to track the one or more real-world performers 108. In some embodiments, the content server 112 can utilize, for example, computer vision, to identify and/or parse the one or more real-world performers 108 from the image, or the series of images. In these embodiments, the content server 112 can feedback one or more positions of the one or more real-world performers 108 within the venue 100 to allow the CCU to track the one or more real-world performers 108 within the venue 100. In these embodiments, the CCU can track the one or more real-world performers 108 to a central location within the image, or the series of images, to constrain the one or more virtual characters 106 to an affixed location within the interactive content 102.

The content server 112 represents one or more computer systems, an exemplary embodiment of which is to be described in further detail below, which facilitate operation of the venue 100. In some embodiments, the content server 112 can be implemented in hardware, firmware, software, or any combination thereof. Further, firmware, software, routines, instructions, and/or applications can be described herein as performing certain actions. However, it should be appreciated that such descriptions are merely for convenience and that these actions result from computing devices, processors, controllers, or other devices executing the firmware, software, routines, instructions, and/or applications. As illustrated in FIG. 1, the content server 112 can enable the interactive content 102 to the portable electronic devices 114 for presentation to the audience 104. As to be described in further detail below, the content server 112 can incorporate the one or more real-world performers 108 into the interactive content 102 as the one or more virtual characters 106. In some embodiments, the content server 112 can capture the movement of the one or more real-world performers 108 within the venue 100. In these embodiments, the content server 112 can identify one or more joints or ligaments, for example, left shoulders, right knees, among others, of the one or more real-world performers 108 from the image, or the series of images, of the one or more real-world performers 108 that has been captured by the one or more cameras 110 as described above. These joints or ligaments can be represented as one or more performer markers. From the example above, the content server 112 can identify the one or more joints or ligaments of the one or more real-world performers 108 waving to the members of the audience 104 within the venue 100.

In some embodiments, the content server 112 can generate one or more three-dimensional models of the one or more real-world performers 108 in a three-dimensional space that emulate the movement of the one or more real-world performers 108 within the venue 100. In these embodiments, the content server 112 can generate one or more three-dimensional models of the one or more real-world performers 108 in a three-dimensional space from the one or more performer markers. From the example above, the content server 112 can generate the one or more three-dimensional models from the one or more performer markers that wave in a substantially similar manner as the one or more real-world performers 108.

In some embodiments, the content server 112 can apply the one or more three-dimensional models of the one or more real-world performers 108 to the one or more virtual characters 106 in the three-dimensional space. In these embodiments, the one or more virtual characters 106 emulate the movement of the one or more real-world performers 108 within the venue 100. From the example above, the content server 112 can apply the three-dimensional models of the one or more real-world performers 108 to the one or more virtual characters 106 in the three-dimensional space to cause the one or more virtual characters 106 to similarly wave as the one or more real-world performers 108. In some embodiments, the content server 112 can render the one or more virtual characters 106 from the three-dimensional space into a two-dimensional space of the interactive content 102 to integrate the one or more real-world performers 108 into the interactive content 102.

In the exemplary embodiment illustrated in FIG. 1, the portable electronic devices 114 can execute the interactive content 102 having the one or more virtual characters 106. In some embodiments, the portable electronic devices 114 can receive the one or more virtual characters 106 in the two-dimensional space of the interactive content 102 from the content server 112. In these embodiments, the portable electronic devices 114 can incorporate the one or more virtual characters 106 in the two-dimensional space of the interactive content 102 into the interactive content 102 to integrate the one or more real-world performers 108 into the interactive content 102. In some embodiments, the portable electronic devices 114 can be manipulated by the members of the audience 106 to interact with the interactive content 102. In some embodiments, the portable electronic devices 114 can include one or more mobile telephony devices, such as mobile phones, mobile computing devices, mobile internet devices, such as tablet computers and/or laptop computers, game controllers; and/or other suitable mechanical, electrical, or electromechanical input devices that will be recognized by those skilled in the relevant art(s) without departing from the spirit and scope of the present disclosure. In these embodiments, the portable electronic devices 114 can include one or more buttons, one or more omnidirectional control sticks or buttons, and/or one or more touch-screen interfaces that can be manipulated by the members of the audience 106 to interact with the interactive content 102.

Figure 2:
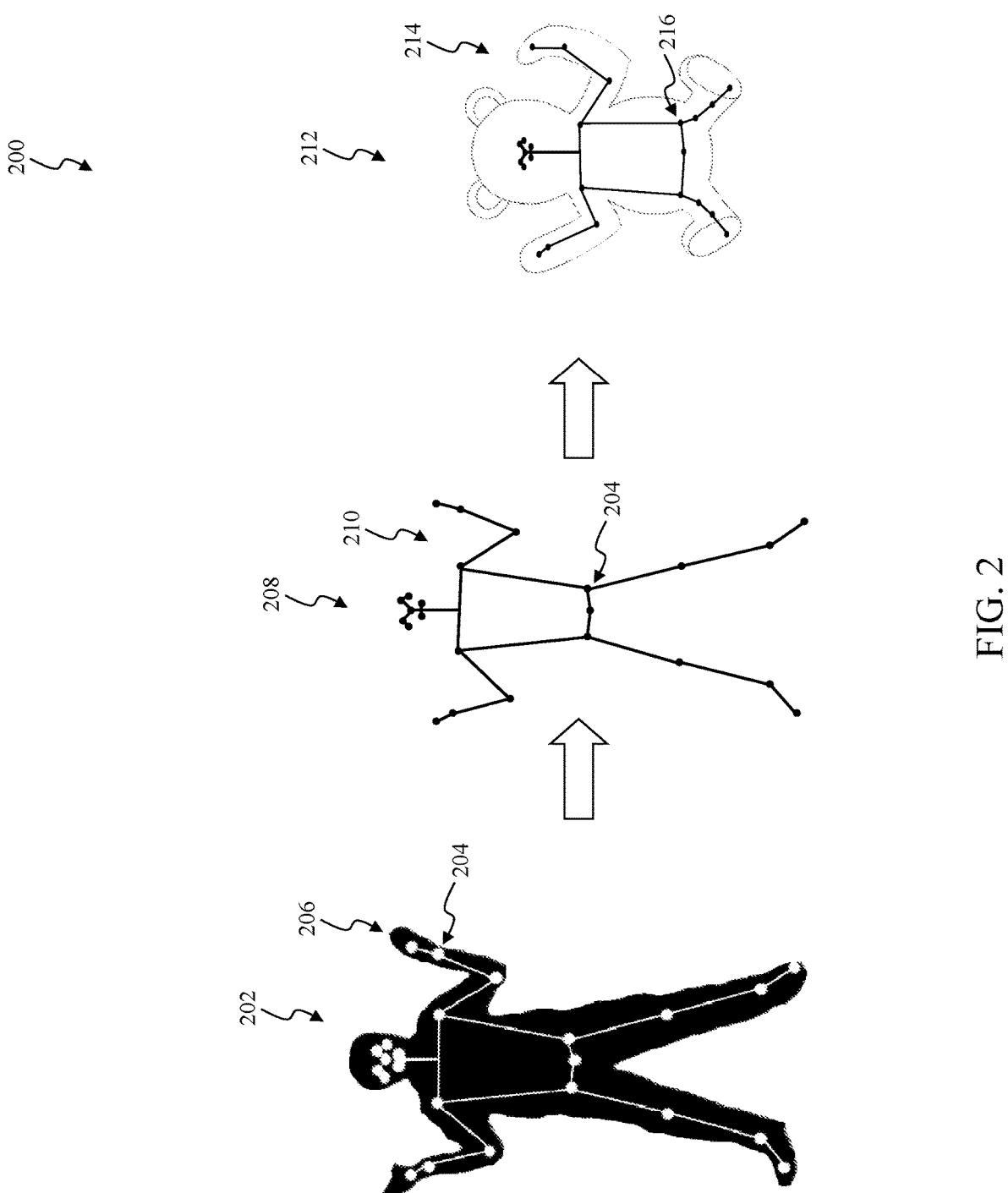
FIG. 2 graphically illustrates an exemplary operational control flow that can be implemented within the exemplary venue to integrate the exemplary performer into the exemplary interactive content in accordance with some exemplary embodiments of the present disclosure.

Exemplary Operational Control Flows to Integrate the Exemplary Performer into the Exemplary Interactive Content FIG. 2 graphically illustrates an exemplary operational control flow that can be implemented within the exemplary venue to integrate the exemplary performer into the exemplary interactive content in accordance with some exemplary embodiments of the present disclosure. The following discussion is to describe an exemplary operational control flow 200 to integrate a performer from a venue, such as one or more of the one or more real-world performers 108 to provide an example, into an interactive content, such as the interactive content 102 to provide an example. The present disclosure is not limited to these exemplary operational control flows. Rather, it will be apparent to ordinary persons skilled in the relevant art(s) that other operational control flows are within the scope and spirit of the present disclosure. The operational control 200 as to be described in further detail below represents one or more modeling tools, that when executed by one or more computer systems, such as the content server 112 as described above, can incorporate the performer from the venue into the interactive content. In some embodiments, the one or more modeling tools can represent one or more software tools, for example, three-dimensional modeling, animating, simulating, and/or rendering software tools, that can be executed by the model processing server 102 to integrate the performer from the venue into the interactive content as to be described in further detail below.

At operation 202, the operational control flow 200 can identify one or more joints or ligaments, for example, a left shoulder, a right knee, among others, of a real-world performer 206. As illustrated in FIG. 2, these joints or ligaments can be represented as one or more performer markers 204. In some embodiments, the operational control flow 200 can identify the one or more joints or ligaments from the image, or the series of images, of the real-world performer 206 in a substantially similar manner as described above. In these embodiments, the operational control flow 200 can capture the image, or the series of images, of the real-world performer 206 in real-time, or near-real time, as the real-world performer 206 is performing in the venue. In these embodiments, the operational control flow 200 can identify the one or more joints or ligaments from the image, or the series of images, of the real-world performer 206 using, for example, any suitable image processing, computer vision, and/or deep learning techniques that will be apparent to those skilled in the relevant art(s) without departing from the spirit and scope of the present disclosure. In some embodiments, the operational control flow 200 can identify and track movement of the one or more performer markers 204 from the image, or the series of images, of the real-world performer 206 as the real-world performer 206 moves within the venue.

At operation 208, the operational control flow 200 can generate a three-dimensional model 210 of the real-world performer 206 in a three-dimensional space from the one or more performer markers 204. In some embodiments, the three-dimensional model 210 can be implemented using a simple three-dimensional stick model; however, more complicated three-dimensional models, such as a wire-frame model, a polygonal model, a solid model, and/or a surface model, are possible as will be apparent to those skilled in the relevant art(s) without departing from the spirit and scope of the present disclosure. In some embodiments, the operational control flow 200 can generate the three-dimensional model 210 to move in the three-dimensional space in a substantially similar manner as the real-world performer 206.

At operation 212, the operational control flow 200 can apply the three-dimensional model 210 to a virtual character 214, such as a virtual bear to provide an example, in the three-dimensional space. In some embodiments, the operational control flow 200 can access a three-dimensional model of the virtual character 214 in the three-dimensional space. In these embodiments, the operational control flow 200 can map the one or more performer markers 204, for example, a left shoulder, a right knee, among others, of the three-dimensional model 210 onto corresponding character markers 216, for example, a left shoulder, a right knee, among others, of the three-dimensional model of the virtual character 214. In these embodiments, the three-dimensional model of the virtual character 214 can be implemented using a simple three-dimensional stick model; however, more complicated three-dimensional models, such as a wire-frame model, a polygonal model, a solid model, and/or a surface model, are possible as will be apparent to those skilled in the relevant art(s) without departing from the spirit and scope of the present disclosure. In some embodiments, this application of the three-dimensional model 210 to the virtual character 214 can cause the virtual character 214 to move in the three-dimensional space in a substantially similar manner as the real-world performer 206. In some embodiments, the operational control flow 200 can graphically render the virtual character 214 from the three-dimensional space into a two-dimensional space of the interactive content to integrate the real-world performer 206 into the interactive content.

Figure 3:
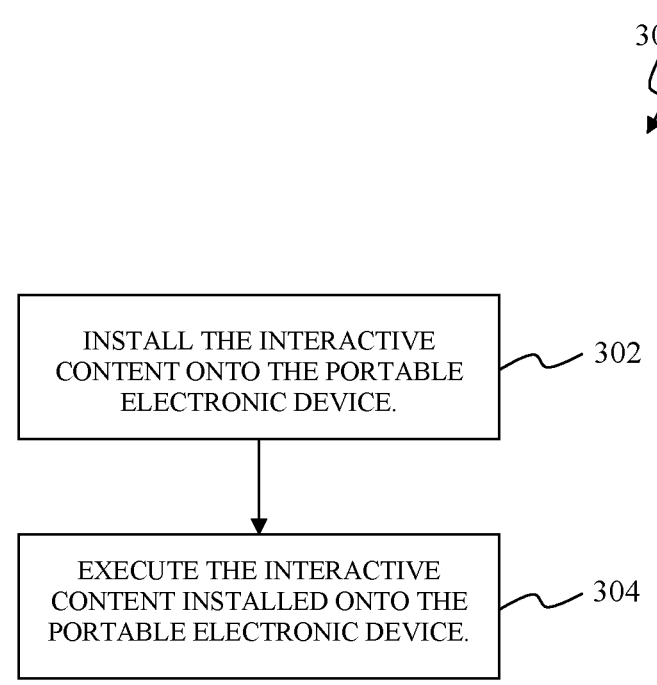
FIG. 3 graphically illustrates another exemplary operational control flow that can be implemented within the exemplary venue to integrate the exemplary performer into the exemplary interactive content in accordance with some exemplary embodiments of the present disclosure.

FIG. 3 graphically illustrates another exemplary operational control flow that can be implemented within the exemplary venue to integrate the exemplary performer into the exemplary interactive content in accordance with some exemplary embodiments of the present disclosure. The following discussion is to describe an exemplary operational control flow 300 to integrate a real-world performer from a venue, such as one or more of the one or more real-world performers 108 to provide an example, into an interactive content, such as the interactive content 102 to provide an example. The present disclosure is not limited to these exemplary operational control flows. Rather, it will be apparent to ordinary persons skilled in the relevant art(s) that other operational control flows are within the scope and spirit of the present disclosure. The operational control 300 as to be described in further detail below can be executed on by a portable electronic device, such as one or more of the portable electronic devices 114 as described above, to integrate the performer from the venue into the interactive content.

At operation 302, the operational control flow 300 can install the interactive content onto the portable electronic device. In some embodiments, the portable electronic device can download an application software, often referred to as an app, having the interactive content. In these embodiments, the portable electronic device can download the application software from a content server within the venue, such as the content server 112 as described above. Alternatively, or in addition to, the portable electronic device can download the application software from a digital distribution platform, also referred to as an app store or app marketplace. After the application software has been downloaded by the portable electronic device, the portable electronic device can install the application software in some embodiments.

At operation 304, the operational control flow 300 can execute the interactive content installed onto the portable electronic device. In some embodiments, the operational control flow 300 can receive a virtual character, such as one or more of the one or more virtual characters 106, that has been rendered onto a two-dimensional space of the interactive content in a substantially similar manner as described above. In these embodiments, the operational control flow 300 can incorporate the virtual character in the two-dimensional space of the interactive content into the interactive content to integrate the real-world performer into the interactive content. In these embodiments, the portable electronic device can include one or more buttons, one or more omnidirectional control sticks or buttons, and/or one or more touchscreen interfaces that can be manipulated by a member of the audience to interact with the interactive content. For example, the interactive content can be included within a video game. In this example, the real-world performer can point at different locations in the venue to target a weapon at an enemy as a part of the video game. In this example, the member of the audience can manipulate the one or more buttons, one or more omnidirectional control sticks or buttons, and/or one or more touchscreen interfaces to fire the weapon at the enemy. In this manner, the real-world performer can help guide, or target, the weapon at the enemy and the member of the audience can fire the weapon at the enemy in the video game. As another example, the interactive content can be included within another form of interactive application such as voting system or navigation, and/or a non-interactive form of visualization.

Figure 4:
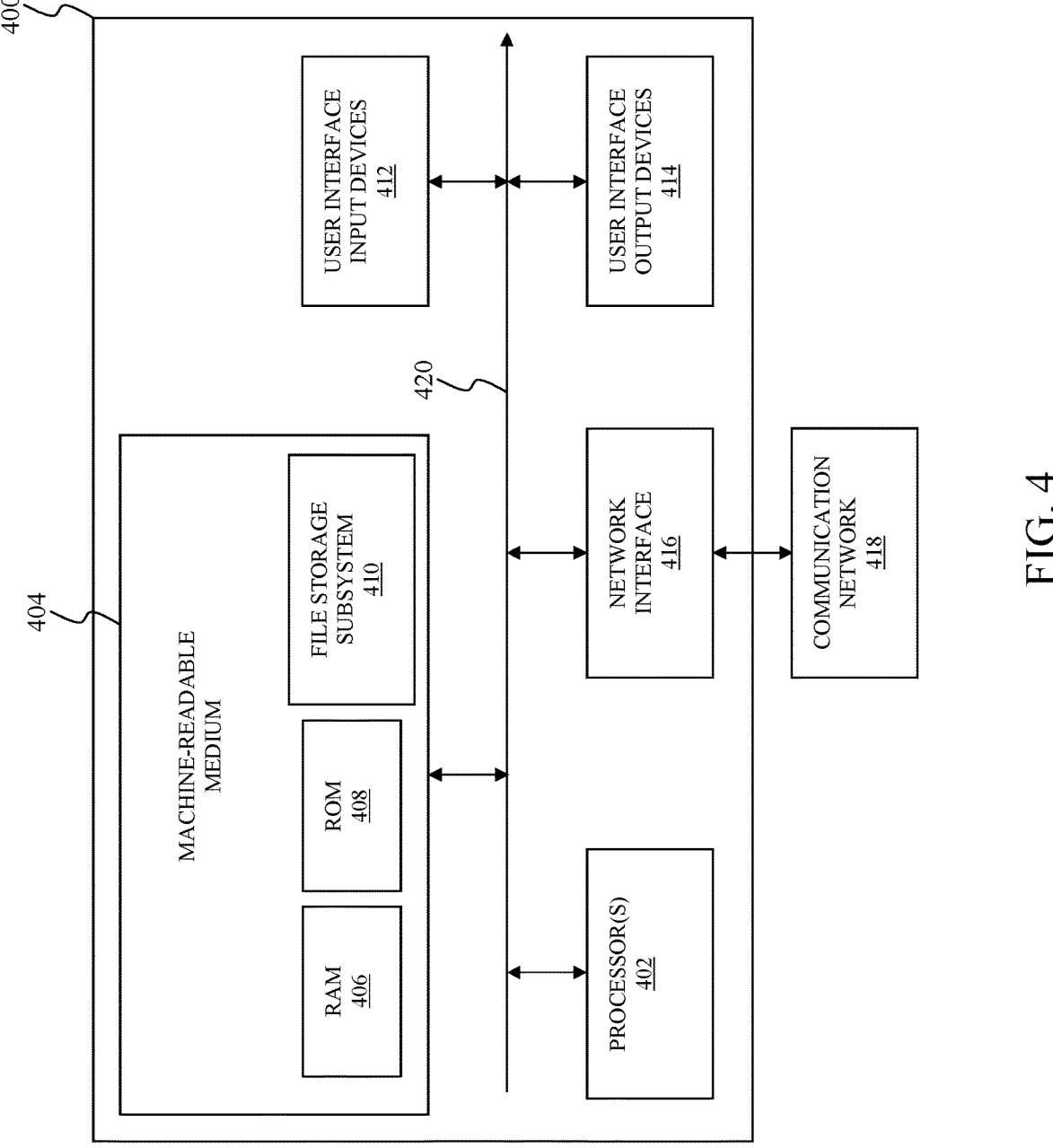
FIG. 4 illustrates a simplified block diagram of an exemplary computer system that can be implemented within the exemplary model processing system according to some exemplary embodiments of the present disclosure.

Exemplary Computer System that can be Implemented within the Exemplary Model Processing System FIG. 4 illustrates a simplified block diagram of an exemplary computer system that can be implemented within the exemplary model processing system according to some exemplary embodiments of the present disclosure. The discussion of FIG. 4 to follow is to describe a computer system 400 that can be used to implement the content server 112 as described above.

In the exemplary embodiment illustrated in FIG. 4, the computer system 400 includes one or more processors 402. In some embodiments, the one or more processors 402 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).) In some embodiments, the computer system 400 can include an operating system, such as Microsoft's Windows, Sun Microsystems's Solaris, Apple Computer's MacOs, Linux or UNIX. In some embodiments, the computer system 400 can also include a Basic Input/Output System (BIOS) and processor firmware. The operating system, BIOS and firmware are used by the one or more processors 402 to control subsystems and interfaces coupled to the one or more processors 402. In some embodiments, the one or more processors 402 can include the Pentium and Itanium from Intel, the Opteron and Athlon from Advanced Micro Devices, and the ARM processor from ARM Holdings.

As illustrated in FIG. 4, the computer system 400 can include a machine-readable medium 404. In some embodiments, the machine-readable medium 404 can further include a main random-access memory ("RAM") 406, a read only memory ("ROM") 408, and/or a file storage subsystem 410. The RAM 406 can store instructions and data during program execution and the ROM 408 can store fixed instructions. The file storage subsystem 410 provides persistent storage for program and data files, and may include a hard disk drive, a floppy disk drive and associated removable media, a CD-ROM drive, an optical drive, a flash memory, or removable media cartridges.

The computer system 400 can further include user interface input devices 412 and user interface output devices 414. The user interface input devices 412 can include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices to provide some examples. The user interface input devices 412 can be connected by wire or wirelessly to the computer system 400.

Generally, the user interface input devices 412 are intended to include all possible types of devices and ways to input information into the computer system 400. The user interface input devices 412 typically allow a user to identify objects, icons, text and the like that appear on some types of user interface output devices, for example, a display subsystem. The user interface output devices 414 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. Generally, the user interface output devices 414 are intended to include all possible types of devices and ways to output information from the computer system 400.

The computer system 400 can further include a network interface 416 to provide an interface to outside networks, including an interface to a communication network 418, and is coupled via the communication network 418 to corresponding interface devices in other computer systems or machines. The communication network 418 may comprise many interconnected computer systems, machines and communication links. These communication links may be wired links, optical links, wireless links, or any other devices for communication of information. The communication network 418 can be any suitable computer network, for example a wide area network such as the Internet, and/or a local area network such as Ethernet. The communication network 418 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

As illustrated in FIG. 4, the one or more processors 402, the machine-readable medium 404, the user interface input devices 412, the user interface output devices 414, and/or the network interface 416 can be communicatively coupled to one another using a bus subsystem 420. Although the bus subsystem 420 is shown schematically as a single bus, alternative embodiments of the bus subsystem may use multiple buses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A content server for incorporating a real-world performer within a venue into an interactive content, the content server comprising:

a memory that stores a video of the real-world performer; and a processor configured to execute instructions stored in the memory, the instructions when executed by the processor, configuring the processor to:

capture movement of the real-world performer from the video, generate a three-dimensional model of the real-world performer in a three-dimensional space that emulates the movement of the real-world performer, apply the three-dimensional model of the real-world performer to a virtual character that is to be incorporated into the interactive content in the three-dimensional space to cause the virtual character to emulate the movement of the real-world performer in the interactive content, render the virtual character from the three-dimensional space into a two-dimensional space of the interactive content to integrate the virtual character within the interactive content, and provide the virtual character to a portable electronic device in response to the portable electronic device executing the interactive content to allow a user of the portable electronic device to interact with the real-world performer through the virtual character within the interactive content.

2. The content server of claim 1, wherein the instructions when executed by the processor, further configure the processor to receive the video from a camera as the real-world performer is performing within the venue.

3. The content server of claim 1, wherein the instructions when executed by the processor, configure the processor to capture the movement of the real-world performer with a markerless approach.

4. The content server of claim 3, wherein the markerless approach is configured to identify and parse the real-world performer from the video to identify the real-world performer from the video.

5. The content server of claim 1, wherein the instructions when executed by the processor, further configure the processor to:

identify a plurality of performer markers of the real-world performer from the video; and generate the three-dimensional model of the real-world performer from the plurality of performer markers.

6. The content server of claim 5, wherein the instructions when executed by the processor, configure the processor to identify one or more joints or ligaments of the real-world performer from the video as the plurality of performer markers.

7. The content server of claim 1, wherein the interactive content is to solicit participation from an audience within the venue to perform actions.

8. The content server of claim 1, wherein the instructions when executed by the processor, configure the processor to provide the virtual character to the portable electronic device to allow the user of the portable electronic device to manipulate one or more buttons, one or more omnidirectional control sticks or buttons, or one or more touchscreen interfaces incorporated within the portable electronic device to interact with the real-world performer through the virtual character within the interactive content.

9. The content server of claim 1, wherein the instructions when executed by the processor, configure the processor to provide the virtual character to the portable electronic device to allow the user of the portable electronic device to engage with the virtual character within the interactive content to complete an action initiated by the real-world performer.

10. The content server of claim 9, wherein the instructions, when executed by the processor, configure the processor to apply the action initiated by the real-world performer to the three-dimensional model of the real-world performer.

11. A method for incorporating a real-world performer into an interactive content, the method comprising:

accessing, by one or more computer systems, a video of the real-world performer;

capturing, by the one or more computer systems, movement of the real-world performer within the venue from the video;

generating, by the one or more computer systems, a three-dimensional model of the real-world performer in a three-dimensional space that emulates the movement of the real-world performer;

applying, by the one or more computer systems, the three-dimensional model of the real-world performer to a virtual character that is to be incorporated into the interactive content in the three-dimensional space to cause the virtual character to emulate the movement of the real-world performer in the interactive content;

rendering the virtual character from the three-dimensional space to a two-dimensional space of the interactive content to integrate the virtual character within the interactive content; and providing, by the one or more computer systems, the virtual character to a portable electronic device in response to the portable electronic device executing the interactive content to allow a user of the portable electronic device to interact with the real-world performer through the virtual character within the interactive content.

12. The method of claim 11, wherein the accessing comprises receiving the video from a camera as the real-world performer is performing within the venue.

13. The method of claim 11, wherein the capturing comprises capturing the movement of the real-world performer with a markerless approach.

14. The method of claim 13, wherein the markerless approach identifies and parses the real-world performer from the video to identify the real-world performer from the video.

15. The method of claim 11, wherein the generating comprises:

identifying a plurality of performer markers of the real-world performer from the video; and generating the three-dimensional model of the real-world performer from the plurality of performer markers.

16. The method of claim 15, wherein the identifying comprises identifying one or more joints or ligaments of the real-world performer from the video as the plurality of performer markers.

17. The method of claim 15, wherein the providing comprises providing the virtual character to the portable electronic device to allow the user of the portable electronic device to engage with the virtual character within the interactive content to complete an action initiated by the real-world performer.

18. The method of claim 15, wherein the generating comprises applying the action initiated by the real-world performer to the three-dimensional model of the real-world performer.

19. The method of claim 11, wherein the interactive content is to solicit participation from an audience within the venue to perform actions.

20. A venue for incorporating a real-world performer into an interactive content, the interactive content is to solicit participation from an audience within the venue to perform actions, the venue comprising:

a content server configured to:

capture movement of the real-world performer within the venue from a video of the real-world performer, apply a three-dimensional model of the real-world performer to a virtual character that is to be incorporated into the interactive content in a three-dimensional space to cause the virtual character to emulate the movement of the real-world performer in the interactive content, and render the virtual character from the three-dimensional space into a two-dimensional space of the interactive content to integrate the virtual character within the interactive content; and a plurality of electronic devices configured to:

receive the virtual character in the two-dimensional space from the content server, execute a software application having the interactive content, and interact with the real-world performer through the virtual character within the interactive content.

21. The venue of claim 20, further comprising a camera to capture the video as the real-world performer is performing within the venue, and wherein the content server is further configured to receive the video from the camera.

22. The venue of claim 20, wherein the content server is configured to capture the movement of the real-world performer with a markerless approach.

23. The venue of claim 22, wherein the markerless approach identifies and parses the real-world performer from the video to identify the real-world performer from the video.

24. The venue of claim 20, wherein the content server is further configured to:

identify a plurality of performer markers of the real-world performer from the video; and generate the three-dimensional model of the real-world performer from the plurality of performer markers.

25. The venue of claim 24, wherein the identifying comprises identifying one or more joints or ligaments of the real-world performer from the video as the plurality of performer markers.

26. The venue of claim 20, wherein the plurality of electronic devices comprise one or more buttons, one or more omnidirectional control sticks or buttons, or one or more touchscreen interfaces incorporated that are manipulated to interact with the real-world performer through the virtual character within the interactive content.

27. The venue of claim 20, wherein the plurality of electronic devices are configured to engage with the virtual character within the interactive content to complete an action initiated by the real-world performer.

28. The venue of claim 27, wherein the content server is configured to apply the action initiated by the real-world performer to the three-dimensional model of the real-world performer.

* * * * *